US011144560B2

United States Patent
Mac an tSaoir et al.

(10) Patent No.: US 11,144,560 B2
(45) Date of Patent: Oct. 12, 2021

(54) UTILIZING UNSUMBITTED USER INPUT DATA FOR IMPROVED TASK PERFORMANCE

(71) Applicant: INTERNATIONAL BUSINESS MACHINES CORPORATION, Armonk, NY (US)

(72) Inventors: Seamus R. Mac an tSaoir, Navan (IE); Sergey Yevgenyevich Tsvetkov, Athboy (IE); Mikhail Sogrin, Kildalkey (IE); Daniel J. McCloskey, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 16/549,497

(22) Filed: Aug. 23, 2019

(65) Prior Publication Data

US 2021/0056113 A1    Feb. 25, 2021

(51) Int. Cl.
*G06F 16/2457* (2019.01)
*G06N 5/02* (2006.01)
*G06N 5/04* (2006.01)
*G06N 20/00* (2019.01)

(52) U.S. Cl.
CPC ......... *G06F 16/24578* (2019.01); *G06N 5/02* (2013.01); *G06N 5/022* (2013.01); *G06N 5/04* (2013.01); *G06N 20/00* (2019.01)

(58) Field of Classification Search
CPC ............ G06N 5/022; G06N 5/02; G06N 5/04; G06N 20/00; G06F 16/24578
See application file for complete search history.

(56) References Cited

U.S. PATENT DOCUMENTS

| 8,438,142 | B2 | 5/2013 | Wu |
| 8,538,982 | B2 | 9/2013 | Effrat |
| 8,868,590 | B1 | 10/2014 | Donneau-Golencer |
| 2006/0129534 | A1* | 6/2006 | Jones ..................... G06Q 30/02 |
| 2012/0032877 | A1 | 2/2012 | Watkins, Jr. |

(Continued)

FOREIGN PATENT DOCUMENTS

| CN | 112417090 A | 2/2021 |
| JP | 2009506429 A | 2/2009 |
| KR | 20080106194 A | 12/2008 |

OTHER PUBLICATIONS

Mell et al., "The NIST Definition of Cloud Computing", National Institute of Standards and Technology, Special Publication 800-145, Sep. 2011, 7 pages.

(Continued)

*Primary Examiner* — Etienne P Leroux
(74) *Attorney, Agent, or Firm* — Michael O'Keefe

(57) ABSTRACT

Methods, systems and computer program products are provided. Terms of unsubmitted input data entered by a user during composition of submitted input data for the performance of a task are identified. For an identified unsubmitted term, a relevance score indicating the relevance of the unsubmitted term to user intent is determined. The relevance score of the unsubmitted term is determined using a graphical semantic model based on the submitted input data as a representation of user intent. The identified unsubmitted term is selected, for use in supplementing the submitted input data for the performance of the task, based on the determined relevance score.

20 Claims, 6 Drawing Sheets

(56) References Cited

U.S. PATENT DOCUMENTS

2017/0097939 A1    4/2017  Zhu
2017/0357824 A1   12/2017  Barday
2019/0171752 A1*   6/2019  Ritter .................... G06F 16/27

OTHER PUBLICATIONS

Muresan, "An Integrated Approach to Interaction Modeling and Analysis for Exploratory Information Retrieval", Conference '06, Aug. 6-11, 2006, 5 pages, Seattle, WA, USA, Retrieved from the Internet: <https://pdfs.semanticscholar.org/f98e/19d76727a31b60cecbb94594dcaa40249549.pdf>.

Routsalo et al., "Interactive Intent Modeling for Exploratory Search", ACM Transactions on Information Systems, Publication date: Oct. 2018, 46 pages, vol. 36, No. 4, Article 44, New York, NY, Retrieved from the Internet: <https://doi.org/10.1145/3231593>.

* cited by examiner

US 11,144,560 B2

UTILIZING UNSUMBITTED USER INPUT DATA FOR IMPROVED TASK PERFORMANCE

BACKGROUND

The present disclosure relates to computing tasks performed based on user input data, and, more particularly, to techniques for supplementing submitted user input data for improved task performance.

SUMMARY

According to an aspect of the present disclosure, a computer implemented method is provided. The method comprises identifying terms of unsubmitted input data entered by a user during composition of submitted input data for a performance of a task. The method further comprises determining, for an identified unsubmitted term, a relevance score indicating the relevance of the unsubmitted term to user intent. The relevance score of the unsubmitted term is determined using a graphical semantic model based on the submitted input data as a representation of user intent. The method further comprises selecting, based on the determined relevance score, the identified unsubmitted term for use in supplementing the submitted input data for the performance of the task.

According to another aspect of the present disclosure, a device is provided. The device comprises a processor, data storage and a user interface. The user interface is configured for a user to enter input data for the performance of a task. The processor is configured to identify terms of unsubmitted input data entered by a user during composition of submitted input data for the performance of a task. The processor is further configured to determine, for an identified unsubmitted term, a relevance score indicating the relevance of the unsubmitted term to user intent. The relevance score of the unsubmitted term is determined using a graphical semantic model based on the submitted input data as a representation of user intent. The processor is further configured to select, based on the determined relevance score, the identified unsubmitted term for use in supplementing the submitted input data for the performance of the task.

According to yet another aspect of the present disclosure, a computer program product is provided. The computer program product comprises a computer readable storage medium having program instructions embodied therewith. The program instructions are executable by a processor to cause the processor to: identify terms of unsubmitted input data entered by a user during composition of submitted input data for the performance of a task; determine, for an identified unsubmitted term, a relevance score indicating the relevance of the unsubmitted term to user intent, wherein the relevance score of the unsubmitted term is determined using a graphical semantic model based on the submitted input data as a representation of user intent, and select, based on the determined relevance score, the identified unsubmitted term, for use in supplementing the submitted input data for the performance of the task.

BRIEF DESCRIPTION OF THE SEVERAL VIEWS OF THE DRAWINGS

Example implementations of the present disclosure will be described below with reference to the following drawings, in which.

DETAILED DESCRIPTION

Figure 1:
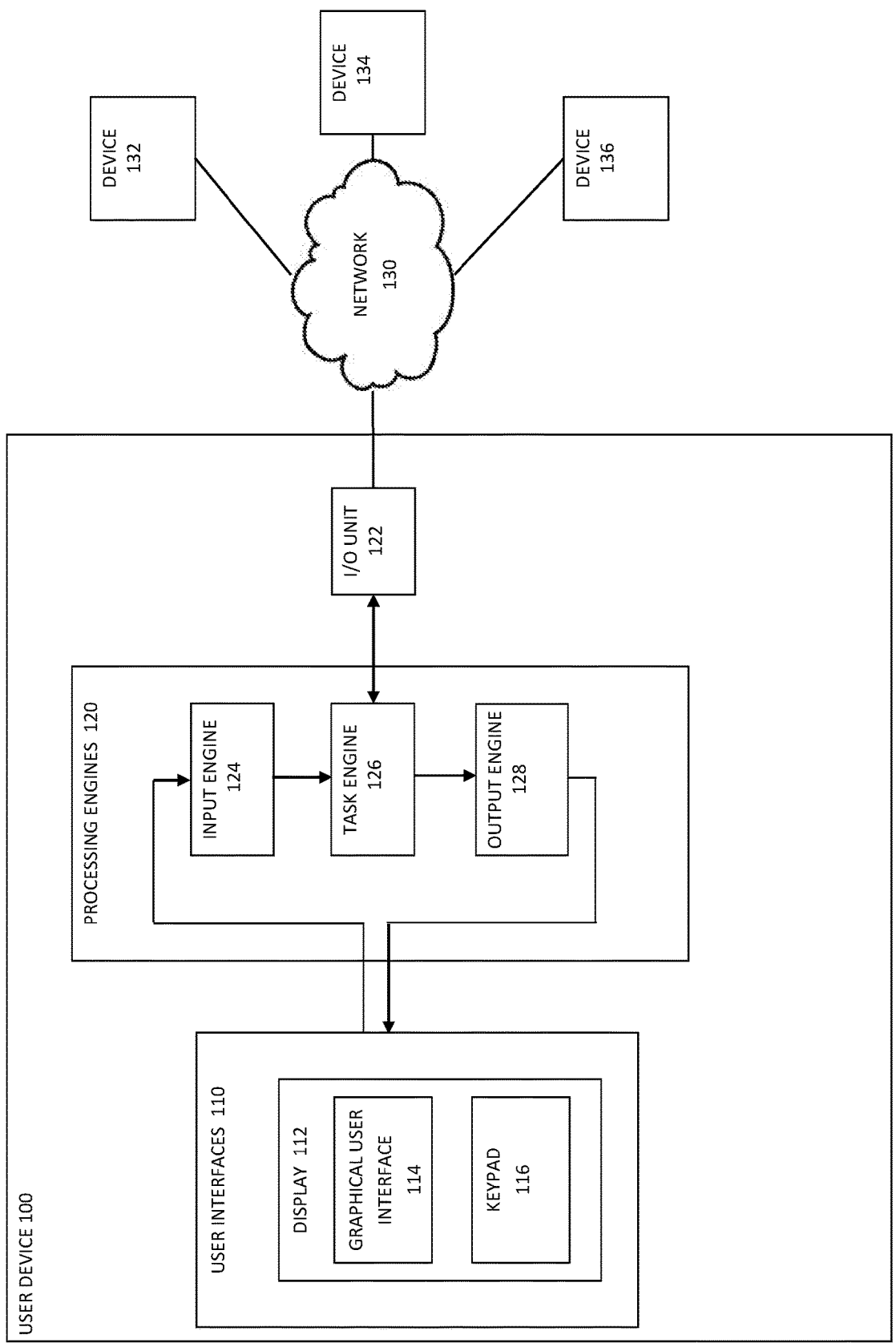
FIG. 1 is a schematic diagram showing a system for performing a task based on user input data.

Many modern computer systems and devices perform tasks in response to input data entered by a user of a user interface. For example, a user may input text data into a browser search window of an Internet search engine to identify web pages that provide answers to a query, or provide more information about a particular topic of interest to the user, based on the input search terms. Similarly, a user may input text data into a search window of a database to identify records matching the input search terms. In other examples, a user may provide input data to a virtual assistant or "chatbot" using text entered in a dialog box or speech to obtain answers to a question. In many cases, the task (e.g., query) may be complex and require specific information in order to perform the task and provide an appropriate response, such as an accurate or specific answer to a question. The quality of the outcome of the task is therefore directly affected by the input data submitted by the user for the performance of the task.

Frequently, users edit their input data a number of times before submitting input data for a particular task. For example, a user entering text data for a search query may change the words or phrasing, expand or contract acronyms, make spelling corrections, use synonyms or hypernyms and/or change the language of terms in the query, prior to submission of a final version of the input data. The user data deleted by these changes during the editing process is lost, and so cannot be utilized to perform the task of responding to the query. In many instances, the lost or "unsubmitted" user data may be insightful in determining the specific aim or objective of the user query—the "user intent" of the query—and thus useful in providing a better-quality answer. However, the reliability of unsubmitted user data cannot be verified. Thus, simply utilizing the unsubmitted user data to supplement the input data submitted by the user for the task may be counterproductive. For example, the unsubmitted data may be unreliable and lead to unintended answers.

The present disclosure proposes utilizing unsubmitted data, entered by a user when composing submitted input data to perform a task, for improved task performance. In particular, example implementations of the present disclosure determine the relevance of unsubmitted user data terms to "user intent" and utilize only unsubmitted user data terms that are determined to be relevant to supplement the submitted user input data.

The present disclosure provides methods, systems and computer program products for improved performance of tasks in response to user input data. In particular, during a user session, in which a user enters input data for a task, changes to the user data (e.g., deletions, modifications and/or additions) are tracked. Upon submission of input data for the query by the user, unsubmitted user data is identified from the tracked data. Terms of the unsubmitted user data are analyzed for relevance to user intent, using a graphical semantic model based on the submitted input data as a representation of user intent. Terms of the unsubmitted user data determined to be relevant to user intent are utilized to supplement the submitted user data for the task.

Example implementations of the present disclosure concern user input data in the form of a "search query" comprising input search terms in the form of text, for providing "search results" such as a list of webpages, data records and the like or a text-based "answer". As the skilled person will appreciate, the present disclosure is applicable to other types of computer-based tasks that are performed based on any type of user input data. The present disclosure is particularly applicable to tasks performed based on user interactions with systems in specialized domains of knowledge that involve language and terminology that is complex or has a specific meaning in the relevant domain.

In the present disclosure, "term" refers to any word, number, phrase, expression, group of characters (e.g., acronym), punctuation mark, symbol, emoji or other text-based data, which may be input into a graphical user interface by a user operating a keyboard, keypad or the like or derived from speech input by speech to text software. Terms may be individually identified from input data using tokenization (e.g., text or word segmentation). The expression "user intent" refers the aim or objective of a user when composing input data for the performance of a task (e.g., to obtain a reliable or accurate answer to a specific query). In relation to "input data", the terms "enter" and "input" are used synonymously to refer to the user providing data, either before (e.g., during editing) or at the time of submission for the performance of a task.

FIG. 1 is a schematic diagram of a system comprising an example user device 100 for performing a task, such as a query, based on user input data. User device 100 comprises user interfaces 110 and processing engines 120. User device 100 further comprises an input/output unit 122 for data communication with devices 132, 134, 136 over a network 130. User device 100 may be a smart phone, tablet, notebook computer, intelligent personal assistant or similar portable computing device. Alternatively, user device 100 may be a desktop computer or similar non-portable computing device. Network 130 may comprise any wired or wireless network such as a Local Area Network, Wide Area Network, mobile network or the Internet. Devices 132, 134, 136 may comprise databases, servers or any other type of network resource for facilitating tasks, such as queries, as described herein.

User device 100 comprises user interfaces 110 including a display 112. In particular, display 112 is configured to display a graphical user interface (GUI) 114 of a program or application, which may include an input box (or equivalent) that allows a user to enter text-based terms or content, as user input data for the corresponding task. In the illustrated example implementation, display 112 comprises a touchscreen, which displays a keypad 116 for the user to enter terms for the task by means of touch gestures on the touchscreen that interact with GUI 114 and keypad 116. In other example implementations, a user may enter terms for the task using other user interfaces 110, such as a keyboard, touchpad or microphone (not shown), as well known in the art.

As discussed above, a user may enter input data comprising one or more terms (e.g., query or search terms) in the input box of the GUI 114, and then edit the terms by addition, modification or deletion thereof. Once the terms are finalized, the user submits the input data, for example by interacting with a "submit" or "search" button on the GUI 114 or by pressing an enter key on the keypad 116. The user input data are then sent to a corresponding one of the processing engines 120 of the program or application of the user device 100 to perform the task.

The processing engines 120 include input engine 124, task engine 126 and output engine 128. Input engine 124 receives and pre-processes the user input data, and provides the pre-processed data to task engine 126 for performing the task. Task engine 126 carries out the task based on the pre-processed input data and generates one or more results. Whilst performing the task, task engine 126 may access data in one or more local devices of the user device 100, such as local data storage (not shown). In addition, task engine 126 may access data in one or more remote devices, such as devices 132, 134, 136 over network 130. Task engine 126 provides the result(s) of the task to output engine 128. Output engine 128 processes the results received from task engine 126 and provides the processed results data for presentation to the user on display 112. For example, the results data may comprise a list of results (e.g., web pages, records, images etc.), an answer to a question based on the terms of the user input data and so on.

As the skilled person will appreciate, the user device 100 of FIG. 1 may access remote devices 132, 134, 136 over network 130 in order to access data and processing resources to perform the task. As the skilled person will appreciate, the user device 100 may equally be a stand-alone device configured for performing tasks or queries using local data or by accessing local databases.

As discussed above, results data obtained by task engine 126 when carrying out the task are based solely on the terms in the submitted user input data. However, the intent of the user in composing the input data for the task may not be adequately captured in the submitted input data or to the required level of precision. Thus, the results data may be poor. If the user considers that the task results presented are unsatisfactory or incomplete, the user typically re-edits the terms of the input data and the task is repeated until a satisfactory result is achieved. This is time consuming and frustrating for the user. Furthermore, if the user does not realize that the task results presented are unsatisfactory or incomplete, reliance may be placed on the unsatisfactory or incomplete information.

Aspects of the present disclosure provide for improved performance of tasks based on user input data, by utilizing unsubmitted data entered by the user when composing the submitted input data, as described further below. Thus, improved results data may be provided to the user. Importantly, aspects of the present disclosure select, for utilization, only unsubmitted data terms that are determined to be relevant to user intent. The relevance of an unsubmitted data term to user intent is determined by evaluation of the term using a graphical semantic model based on the submitted user input data (e.g., an activated sub-graph as described herein). Accordingly, aspects of the present disclosure utilize a graphical semantic model based on the submitted input data as a representation for user intent, which can be utilized to assess the relevance of an unsubmitted term to user intent.

Figure 2:
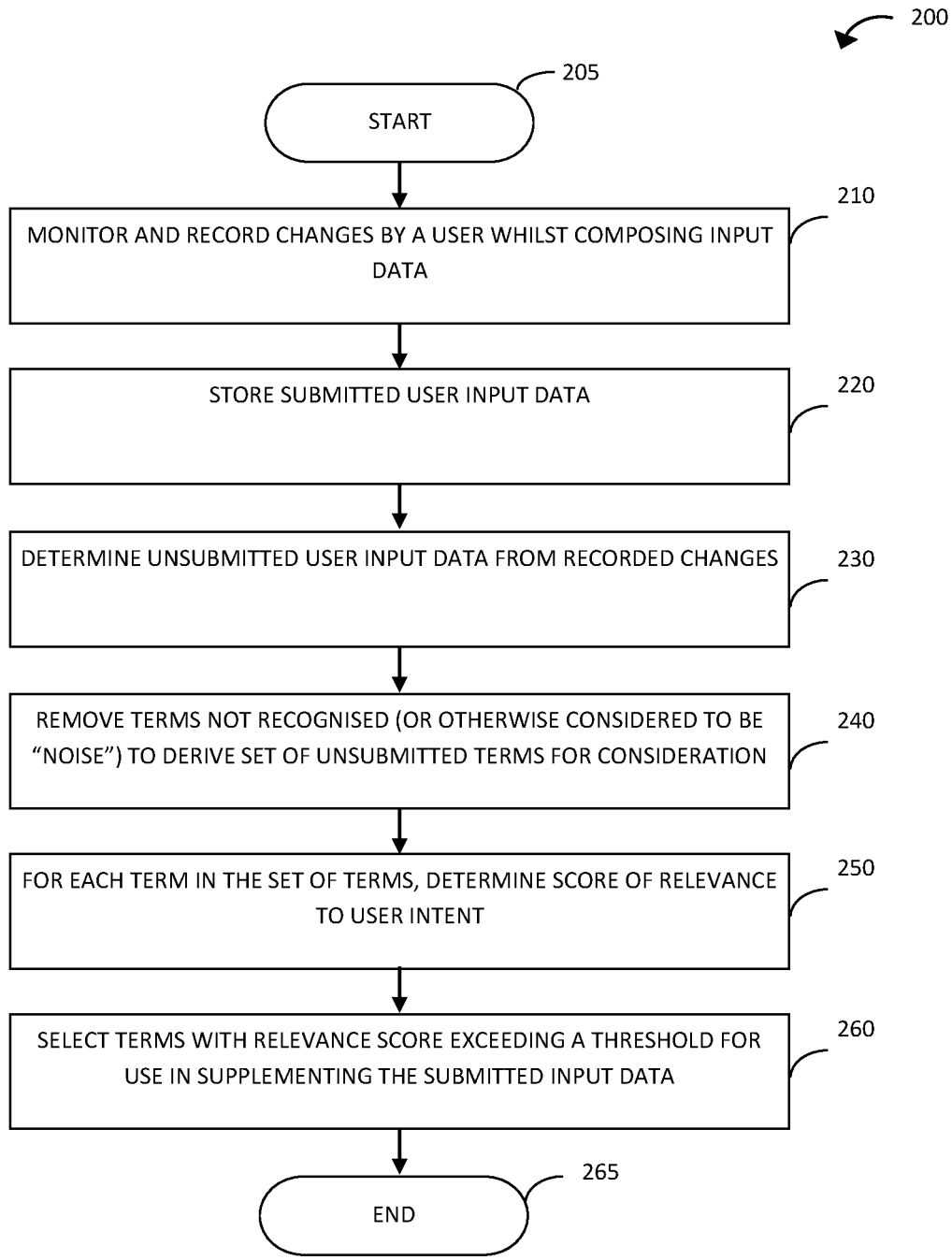
FIG. 2 is a flowchart of a method for identifying unsubmitted user data for a task, that are relevant to user intent, in accordance with example implementations of the present disclosure.

FIG. 2 is a flowchart of a method 200 for identifying terms of unsubmitted user data for a task, which are relevant to user intent, in accordance with example implementations of the present disclosure.

The method 200 starts at step 205. For example, the method 200 may start when a user starts to interact with a user interface (e.g., the GUI 114 of the user device 100 of FIG. 1) for entry of user data for a program or application to perform a task, such as opening a user input window having an input box for entering user data or starting to enter user data therein.

At step 210, the method monitors and records changes (e.g., deletions, modifications and/or additions), whilst the user composes the input data. For example, step 210 may track all user keystrokes that enter data in an input box of a GUI. In response to a user delete action (e.g., detection of a delete or overtype keystroke), step 210 may save the data from the input box immediately prior to the delete action, thereby capturing a "snapshot" of the user data prior to any changes. Thus, step 210 may capture a temporal series of "snapshots" of the data entered by the user, whilst composing the input data for submission, which can be compared to identify changes. As the skilled person will appreciate, other techniques for capturing changes during composition of the input data by the user are possible and contemplated. Step 210 continues to monitor and record changes to the entered user data until the user submits a finalized version of the input data. For example, submission of the user input data may be determined in response to an input data submission action (e.g., detection of an enter gesture or keystroke). Notably, step 210 is generally time-independent, allowing the user to make any number of edits during a session provided by the program or application to enter data for performance of the task. The method then proceeds to step 220.

Step 220 stores the user input data submitted to the program or application for performing the task. As the skilled person will appreciate, step 220 may be performed in combination with step 210. The method then proceeds to step 230.

Step 230 determines the unsubmitted input data from the user input data recorded in step 210. In particular, step 230 may remove the submitted data (i.e., the data stored in step 220) from the data recorded whilst the user was composing the input data (i.e., the data recorded in step 210), to identify the unsubmitted input data. Thus, for example, step 230 may identify terms in captured "snapshots", obtained during composition of the submitted input data, that were not included in the finalized, submitted version of the input data.

Step 240 removes terms, from the unsubmitted data identified in step 230, which are not recognized or otherwise considered to represent "noise", to derive a set of unsubmitted input data terms for consideration. For example, step 240 may filter the unsubmitted input data to remove unrecognized words and phrases, emojis, punctuation marks and other data considered to represent "noise" or that is unsuitable for consideration (e.g., cannot be processed) according to application requirements. In addition, or alternatively, step 240 may select terms in the unsubmitted input data that are considered valid for consideration (e.g., can be processed). Thus, step 240 derives a set of unsubmitted terms that potentially have semantic relevance to the submitted user input data and therefore may be relevant to user intent. In some example implementations, the set of terms may include words and phrases identified by a tokenization process for text or word segmentation. Techniques for processing text to identify terms by tokenization are known in the art, and any suitable technique may be used according to application requirements. In some example implementations, unrecognized terms of the unsubmitted input data that are candidates for spelling correction may be pre-processed using a suitable spelling correction technique. Such terms may include terms entered by the user that were modified or changed in the submitted text. If a correction to the spelling of a term is made, and the corrected term is valid for consideration, the corrected term may be included in the set of unsubmitted terms derived in step 240, but marked as spell corrected (e.g., with an indicator, flag or the like). An example implementation for the handling spelling errors is described below.

At step 250, for each term of the set of unsubmitted data terms derived in step 240, the method determines a score of the relevance of the term to user intent, based on the submitted user input data. In example implementations, the relevance score may be determined by utilizing an activated sub-graph of a semantic network graph, based on the terms of the submitted data, wherein the activated sub-graph is a model representing user intent. As the skilled person will appreciate, the submitted user input data constitutes objective semantic data for user intent. Thus, step 250 may generate an activated sub-graph by performing spreading activation of a semantic network graph based on the submitted user input data, and identify a relevance score for each unsubmitted term using the activated sub-graph, as described below with reference to FIG. 3. The method then proceeds to step 260.

At step 260, the method selects one or more terms of the set of unsubmitted data terms having a relevance score that exceeds a predefined threshold. Terms that have a relevance score above the predefined threshold are considered relevant to user intent. Thus, the threshold is selected, and may be dynamically configured, based on application requirements. Terms selected in step 260 are therefore considered suitable for use in supplementing the submitted input data. For example, the selected terms may be used as input data for processing to perform the task, in addition to the submitted input data, so as to derive an improved response, result or outcome of the task. The method 200 then ends at step 265.

As the skilled person will appreciate, by filtering the unsubmitted data in step 240, and selecting individual terms by segmentation or a similar process, the amount of unsubmitted user input data for processing is reduced, thereby optimizing memory and processing resource usage and minimizing processing time for the subsequent relevance determination.

In some example implementations, step 250 may determine the relevance of a term to user intent, and step 260 may be omitted. For example, step 250 may use a model that provides a probabilistic assertion on relevance instead of a relevance score.

Figure 3:
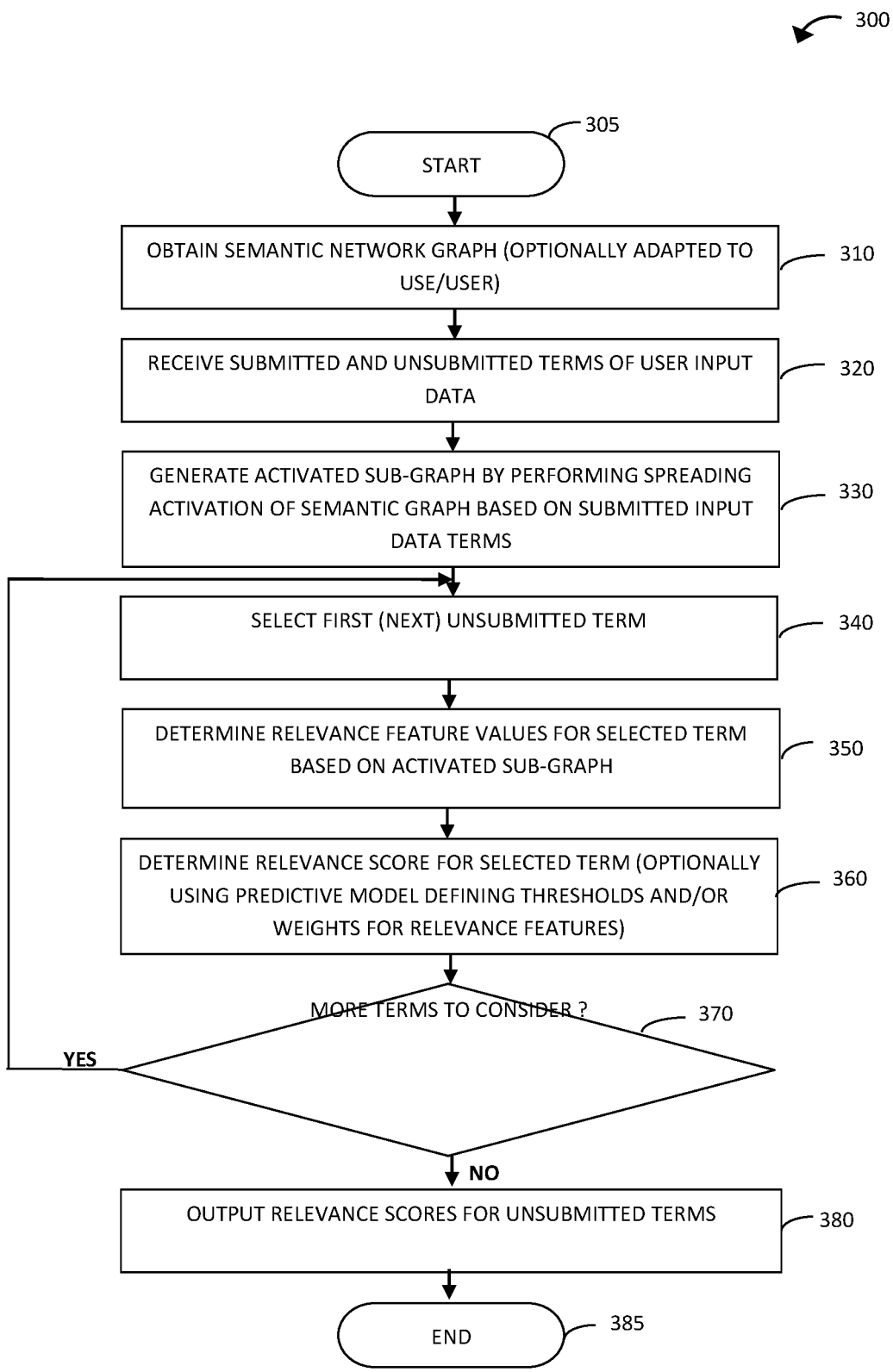
FIG. 3 is a flowchart of a method for determining the relevance of terms of unsubmitted user input data for a task, in accordance with example implementations of the present disclosure.

FIG. 3 is a flowchart of a method 300 in accordance with example implementations of the present disclosure. In particular, the method 300 may be used to determine the relevance of unsubmitted user data terms to user intent. For example, the method may be implemented in step 250 of the method 200 of FIG. 2 or otherwise.

The method 300 starts at step 305. For example, the method may start in response to receiving a set of unsubmitted user input data terms for consideration, for example from step 240 of the method 200 of FIG. 2.

At step 310, the method obtains a semantic network graph. In particular, a semantic network graph may be built for the purposes of the method 300 from suitable available sources, which may range from raw text to full semantic triple stores, according to application requirements. The skilled person will appreciate that any type of structured information about entities and the relationships between the entities may be used to construct the semantic network (e.g., a database with labels describing the content of rows and columns, a set of semantic frame data from a natural language parser etc.). Accordingly, the sematic network graph may be retrieved from data storage associated with a user device. In example implementations, the semantic network graph may be built by a remote device and uploaded and stored in data storage associated with the user device. The semantic network graph obtained may be tailored to the use, i.e., the domain of knowledge of the program or application that performs the task. In addition, the semantic network graph may be adapted to the user, for example, based on a user profile as described below. Thus, step 310 may obtain a semantic network graph for the particular use (i.e., program or application) and/or for the particular user (i.e., based on user profile). The method then proceeds to step 320.

At step 320, the method receives the submitted terms of the user input data for performing the task, together with a set of unsubmitted input data terms, which are potentially relevance to user intent, for consideration.

At step 330 the method performs spreading activation of the semantic network graph obtained in step 310, based on the submitted input data terms to generate an activated (or weighted) sub-graph. In particular, spreading activation may be performed using each of the submitted input data terms that are recognized (i.e., are represented in identifiable nodes) in the semantic network graph obtained in step 310, which defines initial weights for nodes and edges. In the spreading activation process, nodes identified as corresponding to the input data terms are labeled with weights or "activation" in the semantic network graph. The activation is then iteratively propagated or "spread" from those nodes through all connected edges, with a corresponding decay (defined by the initial edge weights), to all adjacent nodes with a corresponding amplification (defined by the initial node weights), as the activation propagates through the network. As the skilled person will appreciate, the spreading activation process itself may be weighted for the application or use-case, as described below.

Accordingly, the spreading activation of step 330 generates an activated sub-graph of the semantic network graph, in which weights or "activation" is associated with each node, thereby providing a semantic model of user intent in accordance with the submitted input data terms. This semantic model of user intent (activated/weighted sub-graph) is also referred to herein as an "activation profile". The activation profile is used to determine the relevance of unsubmitted input data terms to user intent, in subsequent steps 340 to 360. Notably, terms of the semantic network graph obtained in step 310 that are not activated in step 330 are no longer in the activated sub-graph. Thus, irrelevant terms are filtered out automatically. Furthermore, in example implementations, terms that are relevant to user intent based on the submitted input data, for example because they are hypernyms/hyponyms or expanded/contracted versions of terms of the submitted input data, are automatically included in the activation profile in step 330.

At step 340, the method selects the first (or next) unsubmitted term of the set of user input data terms received in step 320. At step 350, the method determines values for one or more "relevance features" for the selected term based on the activation profile. The relevance features comprise parameters associated with the term in the activation profile, in particular, parameters associated with a node representing the term in the activated sub-graph. The skilled person will appreciate that various different relevance features and metrics may be used, either alone or in combination, to evaluate the relevance of a term to user intent using the activation profile. The combination of relevance features considered in step 350 are typically predetermined, based on application requirements. For example, the relevance features may be defined according to a predefined function or model for determining relevance of a term to user intent, as described below.

Table 1 below sets out non-limiting examples of relevance features.

TABLE 1

| Feature Name | Definition | Value Type | Comment |
|---|---|---|---|
| Absence | Absence of term from activation profile | Binary Number Absent = 0 Present = 1 | Absence of term definitively indicates term is not relevant |
| Distance | Distance of term from focus node (focus node is most highly weighted node in activation profile) | Floating Point or Integer Number | A smaller distance to the focus node indicates the term is more relevant (increased feature score) |
| Raw Weight | Raw weight of term in activation profile (e.g., domain relevance, corpus frequency/idf) | Floating Point or Integer Number | A greater raw weight indicates term is probably more relevant (increased feature score) |
| Activated Weight | Activated weight of term in activation profile | Floating Point or Integer Number | A greater activated weight indicates term is more relevant (increased feature score) |
| Graph Theoretical Values | In/out/total degree of term in activation profile (sub-graph) & derived features and other graph theoretical values | Integer Number | Number of edges into and/or out of term may be relevant in combination with other feature scores |

TABLE 1-continued

| Feature Name | Definition | Value Type | Comment |
| --- | --- | --- | --- |
| Edge and Node Type Variations | Proximal edge and node type variations for term | Integer Number | Variations in type of edges and node of term may be relevant in combination with other feature scores |
| Ambiguity | Ambiguity of term (e.g., an ambiguous term is represented by multiple nodes) | Binary Number Ambiguous = 1 Not ambiguous = 0 | Ambiguity indicates term is only relevant in combination with other feature scores |

Table 1 sets out example relevance features "Absence", "Distance", "Raw Weight", "Activated Weight", "Graph Theoretical Values", "Edge and Node Type Variations" and "Ambiguity". Other features and metrics, which may be used to evaluate the relevance of an unsubmitted term to user intent based on the activation profile (activated sub-graph), will be apparent to the skilled person.

At step 360, the method determines the relevance score for the selected term. In particular, step 360 may determine an overall relevance score based on the values of one or more of the relevance features determined in step 350. Thus, step 360 may be performed in combination with step 350. In some example implementations, step 360 determines the relevance score as a predefined function of one or more of the relevance features in step 350. In some example implementations, step 360 may classify the term using a predictive model that defines and optimizes thresholds and/or weights for the relevance features in step 350, as described further below.

Referring to Table 1, the relevance feature "Absence" establishes whether the unsubmitted term is present or absent from the activation profile. Thus, the feature Absence may be used alone in step 360 to determine a relevance score. In particular, if step 350 determines the Absence feature value for an unsubmitted term is 0 (zero—absent from the activated sub-graph), then step 360 can output a relevance score of 0 (zero—not relevant). Accordingly, in example implementations, step 350 may determine the value of this relevance feature first, and if the relevance feature value is 0 (zero), determination of the other relevance features can be omitted. Alternatively, if step 350 determines the Absence feature value for an unsubmitted term is 1 (one—present in the activated sub-graph), then step 360 can output a relevance feature score of 1 (one—relevant), which may be used in combination with the values of one or more of the other relevance features to determine an overall relevance score.

The relevance feature "Distance" establishes the distance of the node corresponding to the unsubmitted term to the focus node, which is the most highly weighted node in the activated sub-graph. In particular, the value of this relevance feature may be a count of the number of edges that are traversed in the sub-graph between the nodes. A smaller value for the Distance feature indicates that the unsubmitted term is close to the most significant semantic characteristic or label of user intent, as represented by the focus node in the activation profile, and thus is more relevant. In contrast, a larger value for the Distance feature indicates that the unsubmitted term is distant from the most significant semantic characteristic or label of user intent, as represented by the focus node in the activation profile, and thus is less relevant. Accordingly, step 360 may determine the relevance score of an unsubmitted term as a function of the Distance relevance feature (e.g., a function defining an inversely proportional relationship). In some implementations, step 360 may take into account the value of the weight of the focus node in the activated sub-graph when determining the relevance score based on the Distance relevance feature.

The relevance feature "Raw Weight" establishes the value of the raw weight of the node corresponding to the unsubmitted term (i.e., the default weight of the node in the semantic graph, prior to spreading activation). Similarly, the relevance feature "Activated Weight" establishes the value of the activated weight of the node corresponding to the unsubmitted term (i.e., the weight or "activation" of the node in the sub-graph, following spreading activation). A larger value of the raw weight, and, more significantly, the activated weight of the node corresponding to the unsubmitted term indicates a higher relevance to use intent. Accordingly, step 360 may determine the relevance score of an unsubmitted term as a function of the Raw Weight and/or Activated Weight relevance features (e.g., a function defining a proportional relationship).

The relevance feature "Graph Theoretical Values" establishes various theoretical values associated with the activated sub-graph. For example, the relevance feature may be the number of edges associated with the node representing to the unsubmitted term in the activated sub-graph, such as the number of edges entering or exiting the node, or both. The relevance feature "Edge and Node Type Variations" determines the number of variations in semantic category exhibited on adjacent nodes and edges to the node representing the unsubmitted term in the activated sub-graph. The values of these two relevance features may combine to indicate the number and type of interactions of the node representing the unsubmitted term with adjacent nodes, which together may indicate relevance to user intent. For instance, a large number of edges representing a particular type of interaction with the node representing the unsubmitted term may indicate greater relevance. This may be particularly useful in applications in a particular domain of knowledge, such as legal or medical domains.

Finally, the relevance feature "Ambiguity" establishes whether the term is represented by a single node (not ambiguous) or by multiple nodes (ambiguous). The value of the Ambiguity relevance feature may be a binary value as indicated in Table 1, but cannot be used alone to determine the relevance score in step 360. Other relevance features and metrics based on the number of nodes in the activated sub-graph representing the unsubmitted term will be apparent to the skilled person, for example a simple count of the number of nodes representing the unsubmitted term (i.e., number of possible interpretations of the term) or the number of nodes associated with the term in the submitted text.

Referring again to FIG. 3, at step 370, the method determines whether there are more unsubmitted terms of user input data received in step 320 to consider. If step 370 determines that there are more unsubmitted terms to consider, the method returns to step 340, which selects the next unsubmitted input data term. The method then continues in a loop through step 340 to 370 until step 370 determines that there are no more unsubmitted data terms to consider. The method then proceeds to step 380.

At step 380, the method outputs the relevance scores for the unsubmitted user input data terms. The method then ends at step 385.

As indicated above, step 360 may determine the relevance score for a selected unsubmitted term using a predictive or classification model, that determines a degree of likelihood that the term is relevant or not relevant to user intent by defining (and optimizing) thresholds and/or weights for a set of relevance features. For example, random forest models may have thresholds for relevance features in a decision tree style in order to make a probabilistic assertion (corresponding to the relevance score) on the relevance of a term, based on the determined feature values for the term. Logistic regression models based on the feature values for a term may produce a score between 0 and 1 (corresponding to the relevance score) that will represent the relevance of the term. The type of model used may vary, dependent upon the available training data. Example implementations use a model with zero training data, where thresholds and weights may be manually configured (or predefined with default values), based on relationships between the relevance features and an overall relevance score, as discussed above. However, in some example implementations, models that utilize training data may be used. For example, logistic regression may determine optimal thresholds and/or weights for each relevance feature by learning based on training examples (e.g., derived from user training and/or feedback). Even more complicated neural net and deep learning models may be used to optimize combinations of relevance features for even greater performance, but such examples require a larger amount of training examples. As the skilled person will appreciate, training data is manually derived through human assessment of worked examples, in which user input data is supplemented with relevant and irrelevant unsubmitted terms. For example, the results of worked examples may be manually assessed to establish which terms lead to better results, and so which unsubmitted terms are relevant. The relevance feature values of the relevant and irrelevant unsubmitted terms may then be evaluated to establish relationships, including thresholds and/or weights, between the values of the relevance features (and combinations) and the actual relevance to user intent. Lexico-semantic similarity techniques and neural language models (e.g., word2vec similarity) based on substantial amounts of training data indicating correct and incorrect examples of relevance, may be used for the most optimal models. However, example implementations of the present disclosure comprise models with minimal or no training data, but utilize feedback data from the user to develop more optimized thresholds and weights for the model(s) through learning.

Feedback from the user may be acquired in a variety of different ways. In one example, the results of a task based on user input data may be presented to the user both with and without the addition of unsubmitted terms determined in accordance with the present disclosure, such as using the method of FIG. 2. The user may then evaluate whether the results are better with or without the additional unsubmitted terms. In another example, the individual terms determined to be relevant in accordance with the present disclosure may be presented to the user at the time of submission of the input data for the task. The user may then select those terms considered to be relevant to their intent (i.e., aim or objective). In each case, the feedback may be evaluated by considering the relevance features scores of the terms considered to be relevant and irrelevant by the user, as discussed above. Other scenarios for acquiring user feedback will be apparent to the skilled person.

User feedback may be useful not only to obtain data for refining a relevance function or updating a predictive model for classifying relevance to user intent, but may also be used to develop a user profile or an activation profile for the above described spreading activation. For example, the spreading activation may be configured so as to emphasize particular semantic characteristics and labels, whilst diminishing or de-emphasizing others. Such configuration may be tailored to the user profile so as to improve the calculation of relevance scores for terms for that individual user.

Example Implementation for Handling Spelling Errors

In the example implementations described above with reference to FIGS. 2 and 3, spelling errors in submitted and unsubmitted input data terms are generally disregarded. In particular, terms containing spelling errors are not recognized in the semantic network graph. Thus, submitted terms with spelling errors cannot be used for spreading activation of the semantic network graph, and unsubmitted terms with spelling errors cannot be identified for the purpose of determining relevance features, and thus an overall relevance score.

In the following example implementations, spelling errors in the unsubmitted input data are considered, since the misspelled terms may be relevant to user intent. Accordingly, after step 230 of the method 200 of FIG. 2, the unsubmitted input data may be pre-processed using the following steps:

(i) categorization categorize the unsubmitted input data determined in step 230 using a spellcheck and/or spell aid algorithm to identify (a) "unrecognized terms" for processing. The categorization additionally identifies (b) "recognized terms" and (c) "recognized multiword/phrases and domain terms", which may be passed for inclusion in the set of unsubmitted terms for consideration in step 240.

As the skilled person will appreciate, recognized terms and recognized multiword/phrases and domain terms are typically represented by nodes in the semantic network graph. Thus, the method 300 of FIG. 3 may be implemented to generate an activated sub-graph (activation profile) based on the input data categorized as (b) and (c).

(ii) recognize misspellings in (a)

find potential misspellings in terms categorized as (a) "unrecognized terms", for example using a configurable spell aid threshold (e.g., a threshold defining an edit distance (between misspellings and correct spellings) for tokens, permitted language model score for multiword).

(iii) recognize misspellings in (b)

find misspellings in terms categorized as (b) "recognized terms", for example identified terms that are not in the activated sub-graph (activation profile) but which have low edit distance to an existing term within activation profile which was not in original query.

(iv) recognize misspellings in submitted input data find misspellings in the originally submitted input data, for example terms that have low edit distance to valid recognized terms categorized as b) and c).

(v) update submitted input data with spelling corrections use the output of steps ii), iii) and iv) above to update the originally submitted input data with spelling corrections for portions of the original input data, including associated edit distance scores.

Thus, the corrected terms of the submitted input data can be used for generating the model of user intent (activation profile) and the relevance of terms of unsubmitted input data in the subsequent steps below.

(vi) (optionally) generate new activated sub-graph (activation profile)

optionally, activate semantic graph with original submitted input data plus the output of step (v) above, to generate the activation profile. The edit distance scores can be used here to weight the initial activation coming from spelling corrections.

(vii) evaluate unsubmitted terms (e.g., by determining relevance feature values)

determine relevance feature values for the unsubmitted terms from a), b) and c) above using the activated sub-graph (activation profile) as originally generated or as generated in optional step (vi), for example as in step 350 of the method 300 of FIG. 3.

An additional "relevance feature" to indicate whether or not the term is a corrected misspelling may be included (e.g., assigned a relevance value such as binary value 0 or 1).

(viii) determine relevance score for unsubmitted terms determine overall relevance score for the unsubmitted terms categorized as a), b) and c) above, using either a predefined function based on one or more of the relevance feature values in step (vii) or a prediction model based on one or more of the relevance features, as described above in relation to step 360 of the method 300 of FIG. 3.

The predefined function or prediction model includes the additional "relevance feature" indicating whether the term is a corrected misspelling. This feature would allow simple models like logistic regression or random forests to overcome poor values in other semantic network sourced features, which could be due to poverty of graph detail in the chosen domain, with small amounts of training data.

ix) update input data the input data submitted for the performance of the task may be supplemented to include the additional unsubmitted terms that were deemed relevant to the user's intent. The same terms can be weighted differently to the original terms the user submitted, even making use of any of the feature scores from the analysis performed in assessing relevance, to aid in improving ranking of correct answers.

As the skilled person will appreciate, handling spelling errors as described above may provide improved results. The use of the additional edit distance score for a corrected submitted input data term in producing the (updated) activation profile ensures that the degree of confidence in the activation of the node representing the corrected term is taken into account. Thus, for example, the activation weight of labeled nodes corresponding to corrected submitted terms in the activated sub-graph may be divided by the edit distance score when generating the activation profile. Similarly, the use of the additional relevance feature to indicate a corrected term (i.e., a spelling correction has been made) may be used in determining how the activation profile is generated and used.

The nature of unsubmitted user input data is such that over-corrected misspellings or even simple typographical errors by a user can result in the loss of critical aspects of user intent, which, if they were received by the application performing the task (e.g., query), might have had a strong effect on the success of the user outcome. Example implementations that capture and correct such mistakes, and identify them as such with an identifier such as a flag that is used as a feature value, are no longer restricted to a purely probabilistic outcome. The flag will serve a dual purpose in the context of other feature values: to allow a term that the user intended even though it may not be statistically probable, and, in contrast, given the presence of another vector of feature values, the recognition that the corrected term is not relevant to the general user intent. Thus, the relevance of a misspelt unsubmitted data term to user intent can be captured in order to determine whether it is useful for supplementing the submitted terms to improve task performance.

Examples of use scenarios and applications of the present disclosure are described below.

Multilingual Information Retrieval (IR) System

In a multilingual IR system, a user may compose input data for submission as a query in multiple languages. In consequence, the unsubmitted input data terms may also be in multiple languages. Thus, in accordance with the present disclosure, a semantic model of user intent takes account of multiple languages that may be used in the input data terms. Accordingly, for such a multilingual implementation, the semantic network graph may be built from open domain triple stores of multilingual unique identifiers for semantic concepts, examples of which are well known to the skilled person (e.g., Babelnet with DBPedia, Yago etc). Thus, a multilingual semantic network graph is retrieved in step 310 of the method 300 of FIG. 3. This means that a unique identifier for a concept (node) that is multilingual may be utilized for determining relevance of a term to user intent, irrespective of the language of the term defining the concept. Thus, each term is normalized to a unique semantic identifier, irrespective of language. Accordingly, spreading activation of the multilingual semantic graph, in step 330, will label and activate nodes for the terms in the submitted user input data, which may include terms in different languages. Unsubmitted terms, which also may include terms in different languages, may then be assessed for relevance using steps 340 to 360.

In scenarios in which the application performing the query, based on the submitted user input data, stores data in separate indexes per language, additional steps may be required. For example, prior to step 340, all languages used across the set of unsubmitted input data terms (and optionally also the submitted input data terms) may be identified. Such identification may be used to determine which indexes to expand the search to when performing the query, beyond that of the language of the finally submitted query. Thus, for example, the application may generate separate queries, based on the submitted input data and additional unsubmitted data terms determined to be relevant to user intent in accordance with the present disclosure, in each of the identified languages. In particular, the multilingual semantic graph may be used to identify unsubmitted and submitted terms in the other identified languages. The results of such queries may be combined to provide improved results, such as answers to the query.

Medical Domain—Analysis of Patient Records

The analysis of patient records in the medical domain typically involves searching a database for patient records having certain information in common, such as particular treatments and outcomes for patients diagnosed with a certain medical condition. Accordingly, the semantic model of user intent for this application is derived from a semantic network graph from the domain of medical knowledge and includes specialist pharmaceutical and medical terminology. For example, the semantic network graph may be built from UMLS medical domain meta-ontology. However, medical records and patient history can be highly ambiguous, since the records data are input by multiple users having different skills and expertise and may include acronyms, abbreviations, spelling errors and other ambiguous text. As described above, ambiguous terms may include multiple unique semantic identifiers in the semantic graph. The terms of the submitted user input may be disambiguated using unsubmitted data terms, for the purposes of activation spreading.

Consider a scenario, in which a user wishes to identify records of patients treated for cancer with batracylin (also known as daniquidone). The drug batracylin is often abbreviated in patient records to "bat". However, the term "bat" may have three or more separate semantic identifiers—the mammal, the object (e.g., baseball bat) or the abbreviation (for batracylin). Consider the following two examples of user submitted data search terms and unsubmitted terms:

"patient treated for neoplasmic activity in stage 2 lung cancer with initial bat dose, twice daily"

"ptnt treated with bat, negative rctn (and an edit by the user when composing the search terms contains the word Daniquidone)"

By using the unsubmitted term "Daniquidone" in the second example, the present disclosure can more easily determine the true meaning of the user intent of the term "bat" relates to batracylin the cancer drug rather than, for example, a negative reaction from a potential animal allergy from a "bat" (the mammal) or a trauma from an assault with a baseball "bat" (the object).

Legal Domain—AI Lawyer (Chat Bot)

An AI lawyer "chat bot" may be developed to identify legal issues, and provide legal signposts and basic legal advice for users in response to a set of user input search terms describing scenarios of concern. Accordingly, the semantic model of user intent for this application is derived from a semantic network graph from the legal domain of knowledge. In particular, the semantic network graph may be built from legal domain concepts extracted from raw text and linked by co-occurrence within context of a legal document paragraph, combined with open domain linked data. In order to identify all the relevant legal issues and provide the user with the most appropriate legal signposts and advice, the terms of the user input data should be as precise as possible. The techniques of the present disclosure are therefore particularly beneficial for this type of use scenario. This can be illustrated by the following example scenario.

EXAMPLE

AI Lawyer That Identifies Compliance Issues of Business Proposal

The user seeks to determine that legal compliance is met with respect to a scenario describing a business proposal. The business proposal could be entered using the following submitted input data search terms: "I want to start a business selling animal supplies", with a previous edit stating "I want to start a website selling dog beds". Both descriptions might be considered accurate, and a "dog bed" can be considered a specific type of "animal supply". Thus, in accordance with the present disclosure, the system can determine that the unsubmitted search terms "website" and "dog bed" are relevant to the submitted user intent by semantic association with the domain sub-graph (hypernym-hyponym semantic relationship). These additional input terms may reveal significant compliance matters that may not otherwise be signposted. For example, terms that indicate that a proposed business is online, through a website, may identify specific legal issues that do not arise with businesses that are not online, such as data protection and privacy. Moreover, terms that suggest that the business may have potential interaction with children can have very particular requirements for data privacy when it comes to child privacy protection, including parental consent. In this case, the unsubmitted search terms "website" and "dog bed" signpost the need for data protection compliance, including in relation to child privacy, since children are likely to have an interest in acquiring accessories for their pet dogs. In the interest of compliance with the law, it is very important to ensure that as complete and thorough an analysis as possible can be conducted to identify all issues concerning user intent (i.e., aims and objectives of the user). Accordingly, the techniques of the present disclosure may be implemented for improved results for applications in the legal domain.

Figure 4:
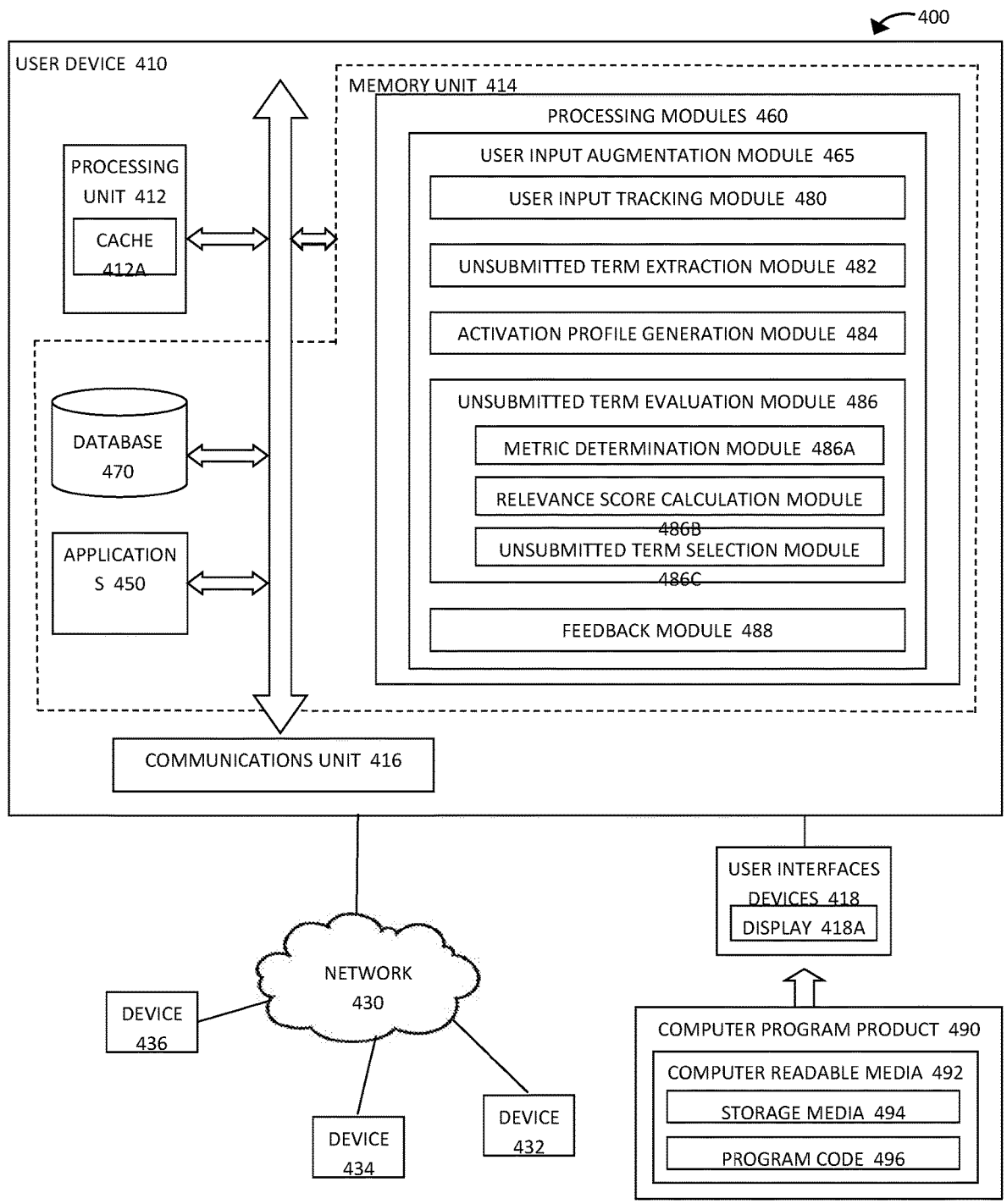
FIG. 4 is a block diagram of a system in accordance with example implementations of the present disclosure.

FIG. 4 is a block diagram of a system 400 in accordance with example implementations of the present disclosure. In particular, the system 400 comprises a user device 410, such as a smart phone, tablet, notebook computer or similar portable computing device. Alternatively, device 410 may be a desktop computer or similar non-portable computing device.

User device 410 comprises processing unit 412, memory unit 414, and communications unit 416. Processing unit 412 may include cache memory 412A, for temporarily storing data for processing as described herein. User device 410 also includes user interface devices 418, which include a display 418A such as a touchscreen. User interface devices 418 may also include one or more other internal or external user input devices such as a mouse, touchpad and microphone. Other features of user device 410, such as a power source, camera, accelerometer, are omitted for ease of understanding of the present disclosure.

Communications unit 416 is configured for connection to a network 430, as described herein, for exchanging data with remote devices 432, 434, 436 (e.g., databases, servers and other resources). Network 430 may comprise any suitable wired or wireless data communications network, such as a local area network (LAN), wide area network (WAN), mobile network or the Internet. In some example implementations, communications unit 416 is configured for connection to more than one network.

Memory unit 414 stores instructions executable by processing unit 412 for operating the user device 410. In particular, memory unit 414 includes applications 450 and processing modules 460. In addition, memory unit 414 stores system and user data, for example in a database 470. In particular, database 470 may store input data received from a user via user interface devices 418 and data received from one or more devices 432, 434, 436 via network 430 and communications unit 416.

In accordance with the present disclosure, processing modules 460 include a user input augmentation module 465. User input augmentation module 465 is configured to perform a method in accordance with the present disclosure, such as the method 200 of FIG. 2 and/or the method 300 of FIG. 3. In particular, user input augmentation module 465 may operate when a user inputs data into a GUI, displayed on display 418A, of a program or application 450 for performing a task (e.g., query), as described herein.

In the illustrated example implementations, user input augmentation module 465 comprises user input tracking module 480, unsubmitted term extraction module 482, activation profile generation module 884, unsubmitted term evaluation module 486 and feedback module 488.

User input tracking module 480 is configured to monitor changes by a user whilst composing input data, and record user changes (e.g., deletions, modifications and/or additions to text-based data), in accordance with the present disclosure. For example, user input tracking module 480 may store snapshots of user data entered in a displayed GUI in cache memory 412A, as described herein, or otherwise record changes as the user composes the input data.

Unsubmitted term extraction module 482 is configured to determine unsubmitted data terms for consideration, in accordance with the present disclosure. In example implementations, following submission of input data by a user, unsubmitted term extraction module 482 may determine unsubmitted data from the changes recorded by user input tracking module 480 and identify unsubmitted data terms that are recognized and potentially relevant to user intent.

Activation profile generation module 484 is configured to determine an activation profile based on the submitted input data, in accordance with the present disclosure. In example implementations, following submission of input data by a user, activation profile generation module 484 obtains a semantic network graph and performs spreading activation based on the submitted input data terms, to generate an activated sub-graph as a semantic model for user intent, as described herein. The semantic network graph may be retrieved from database 470 or another part of memory unit 414, based on the user (e.g., user profile) and/or based on the program or application (i.e., use) for which the input data is provided.

Unsubmitted term evaluation module 486 is configured to evaluate the unsubmitted terms provided by the unsubmitted term extraction module 482 for consideration, using the activation profile provided by activation profile generation module 484, as described herein. In example implementations, unsubmitted term evaluation module 486 comprises metric determination module 486A, relevance score calculation module 486B and unsubmitted term selection module 486C. In particular, unsubmitted term evaluation module 486 receives unsubmitted input data terms extracted by unsubmitted term extraction module 482, and determines the relevance of each term to user intent, as described herein. Metric determination module 486A determines values for a term, such as a predetermined set of relevance feature values as described above. In particular, the relevance features may comprise parameters associated with a representation of the term in the activation profile. Relevance score calculation module 486B calculates an overall relevance score for the term using the set of relevance feature values for the term. As described herein, the relevance score provides an indication of the relevance of the term to user intent. Relevance score calculation module 486B may utilize a predefined function or model (e.g., predictive model or other type of classification model) to calculate the relevance score, or classify the relevance of a term, based on the set of relevance feature values for the term. Unsubmitted term selection module 486C may select unsubmitted terms from the unsubmitted input data terms extracted by unsubmitted term extraction module 482, for use in supplementing or augmenting the submitted input data. For example, unsubmitted term selection module 486C may use a threshold for the relevance score determined by relevance score calculation module 868B, for selection of such unsubmitted terms.

Feedback module 488 is configured to handle feedback from the user in relation to performance of the user input augmentation module 486, as described herein. In particular, feedback module 488 may be configured to seek, receive and process feedback from a user, in order to update one or more modules of user input augmentation module 465, such as the functions and models thereof, as described herein.

With continuing reference to FIG. 4, a computer program product 490 is provided. The computer program product 490 includes computer readable media 492 having storage media 494 and program instructions 496 (i.e., program code) embodied therewith. The program instructions 496 are configured to be loaded onto memory unit 414 of user device 410, for example as a processing module 460 using one of user interface devices 418 or a device connected to network 430 via communications unit 416. In example implementations, program instructions 496 comprise one or more of user input augmentation module 465, user input tracking module 480, unsubmitted term extraction module 482, activation profile generation module 484, unsubmitted term evaluation module 486 and feedback module 488, configured to perform one or more steps of the methods disclosed herein, such as the method 200 of FIG. 2 and/or the method 300 of FIG. 3.

The methods described herein enable improved performance of tasks by programs and applications in response to user input data. This is achieved by leveraging unsubmitted data, entered by the user whilst composing (e.g., editing) the input data for submission. Significantly, the methods described herein provide a mechanism for establishing the reliability of unsubmitted input data terms, by identifying terms that are relevant to user intent for the task based on the submitted input data. The relevance determination uses a graphical semantic model based on the submitted input data as a representation of user intent. Thus, the relevance an unsubmitted data terms to user intent provides a measure of confidence that the respective terms are useful to the program or application for performance of the task. Example implementations are lightweight, require little or no training data and can be performed entirely on the user device. Accordingly, a user can decide whether or not to use the method with particular programs and applications by configuration of the user device. Thus, the user has control of the data submitted to the program or application that performs the task, which may be external to the user device. A semantic network graph may be initially provided to the user device, which may be used as the basis for generating an activated sub-graph as described herein. The semantic network graph may be a generic semantic network graph, a domain specific semantic network graph (e.g., for a particular program or application as in some of the examples described herein), or may be a semantic network graph that is otherwise optimized for an application or use scenario. Accordingly, a user device may store a plurality of semantic network graphs for use with corresponding programs or applications or types thereof.

Furthermore, a semantic network graph may be adapted to a user, based on a user history or a semantically labeled user profile, for use in generating an activated sub-graph for improved determination of relevance of a term to user intent. In particular, a user history may be recorded during the use of the techniques described herein or a semantically labelled user profile may be obtained. Such user information can be utilized to improve accuracy of the relevance calculation or classification, without requiring any further training data. Techniques such as filtering on the semantic categories in the graph, based on categories found in previously selected answers, or the choice of a most appropriate domain graph for each user, may be performed as a preceding step before activating the semantic network graph to generate a model of the user intent (e.g., before step 330 of the method 300 of FIG. 3). The adapted (e.g., filtered) semantic network graph may be stored by the user device for future use.

In some scenarios, the entire activation profile itself may be considered to represent user intent with respect to the domain content. In such cases, user authored forms may be used to select portions of this sub-graph as relevant to the task, to derive a more focused representation of user intent. For example, a user may be provided with a form, following submission of input data for a task, to identify semantic concepts behind the input data. Such an approach may mitigate the likely flaws in representativeness of any available semantic network as a representation of the infinity of potential user intents. A user's awareness of his/her intent is always greater than the ability of any finite semantic network to represent it. Such user authored forms may also allow the user to control the submission of unsubmitted terms to the program or application performing the task.

Whilst the present disclosure has been described and illustrated with reference to example implementations, the skilled person will appreciate that the present disclosure lends itself to many different variations and modifications not specifically illustrated herein.

The present disclosure encompasses a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of a computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some example implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to example implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various example implementations of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
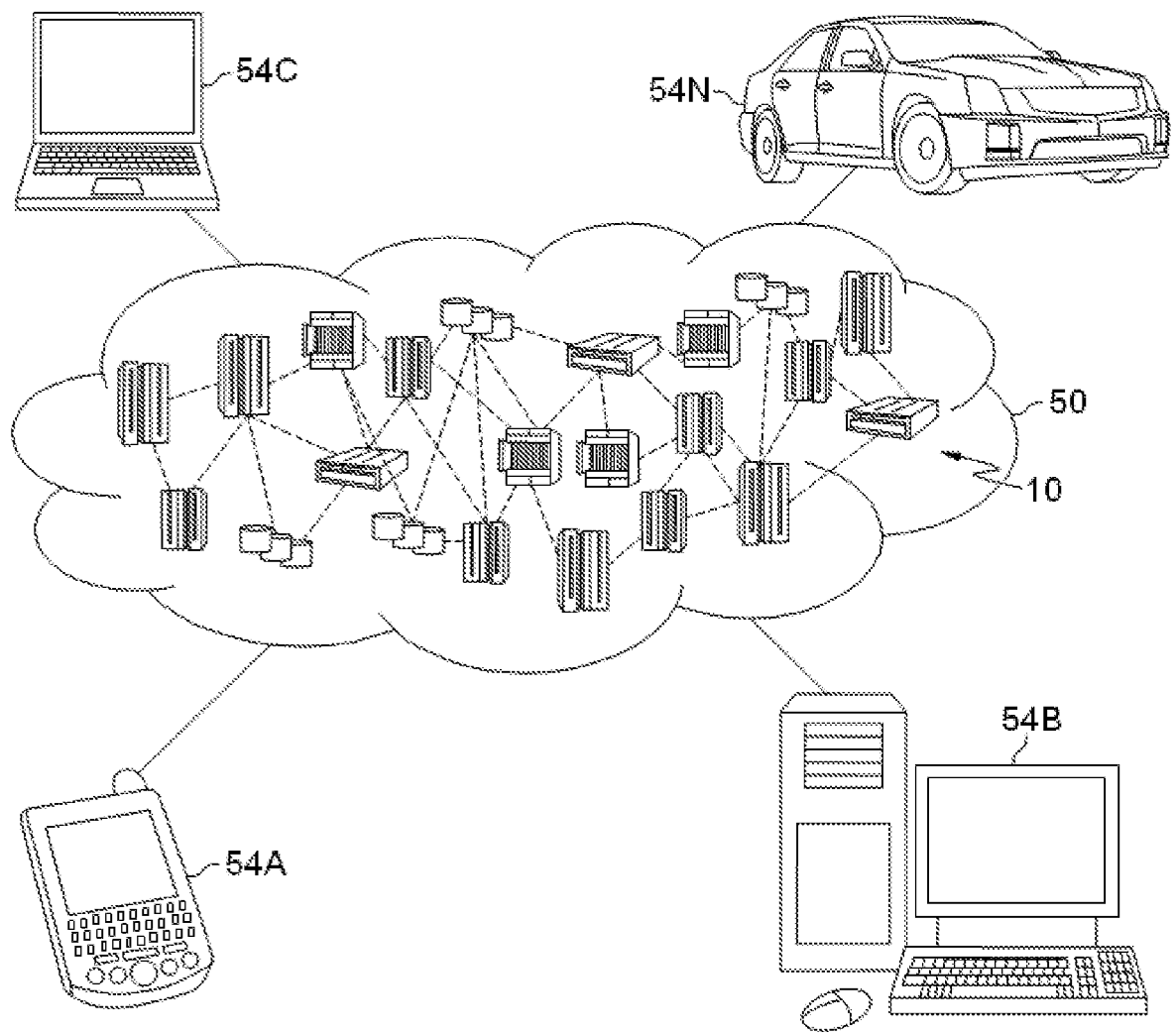
FIG. 5 illustrates a cloud computing environment, in accordance with an embodiment of the invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
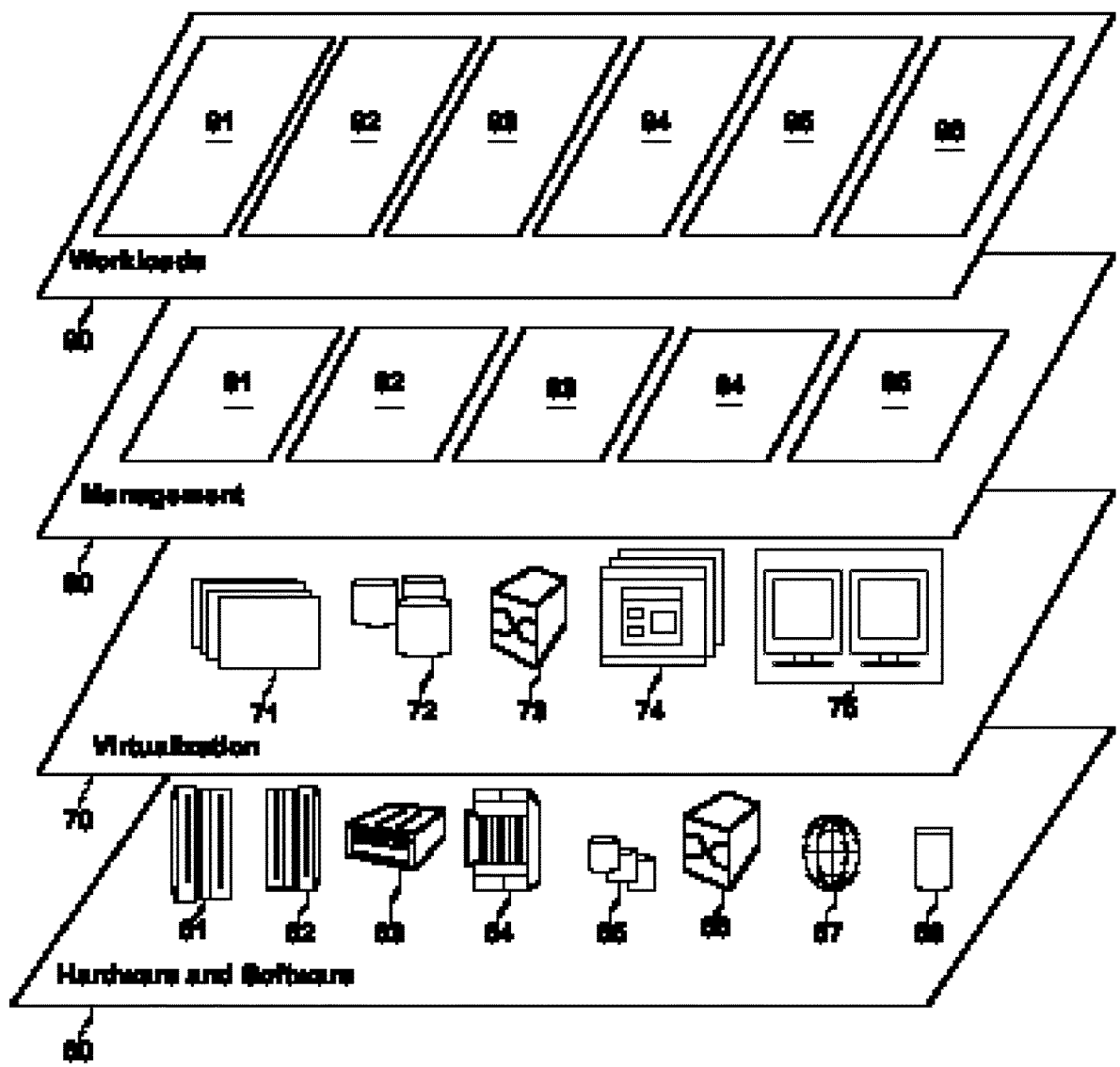
FIG. 6 illustrates a set of functional abstraction layers provided by the cloud computing environment of FIG. 4, in accordance with an embodiment of the invention.

Referring now to FIG. 6, a set of functional abstraction layers provided by cloud computing environment 50 (FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user input relevance determination 96.

The descriptions of the various example implementations of the present disclosure have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the example implementations, the practical application or technical improvement over technologies found in the marketplace, or to enable others of ordinary skill in the art to understand the implementations disclosed herein.

What is claimed is:

1. A computer implemented method comprising:
    identifying terms of unsubmitted input data entered by a user during composition of submitted input data for the performance of a task;
    determining, for an identified unsubmitted term, a relevance score indicating the relevance of the unsubmitted term to user intent, wherein the relevance score of the unsubmitted term is determined using a graphical semantic model based on the submitted input data as a representation of user intent, and
    selecting, based on the determined relevance score, the identified unsubmitted term, for use in supplementing the submitted input data for the performance of the task.

2. The method of claim 1, wherein determining the relevance score comprises:
    determining a value of one or more of a set of relevance features for the unsubmitted term, wherein each relevance feature is a parameter associated with a representation of the unsubmitted term in the graphical semantic model, and
    determining the relevance score based on the determined one or more relevance feature values.

3. The method of claim 2, wherein the relevance score is determined as a function of the determined one or more relevance feature values, wherein the function defines one or more of thresholds and weights for each relevance feature value.

4. The method of claim 2, wherein the relevance score is determined using a predictive model of relevance to user intent based on the set of relevance features.

5. The method of claim 1, further comprising:
    obtaining a predefined semantic network graph;
    performing spreading activation of the semantic network graph, based on terms of the submitted user data, to generate an activated sub-graph, and
    utilizing the activated sub-graph as the graphical semantic model.

6. The method of claim 5, wherein the relevance score is determined based on one or more values of a set of relevance features comprising parameters associated with at least one node representing the unsubmitted term in the activated sub-graph.

7. The method of claim 6, wherein the relevance features include absence of a node representing the unsubmitted term in the activated sub-graph, wherein the relevance score is determined to be least relevant if a node representing the unsubmitted term is absent from the activated sub-graph.

8. The method of claim 6, wherein the relevance features comprise one or more parameters selected from the group consisting of:
    absence of a node representing the term in the activated sub-graph;
    distance of a node representing the term from focus node in the activated sub-graph;
    raw or activated weight of a node representing the term in the activated sub-graph;
    number of in, out or total edges connected to a node representing the term in the activated sub-graph;

variations in the types of edges and nodes that are in proximity to a node representing the term in the activated sub-graph;

number of nodes representing the term in the activated sub-graph, and other features or metrics derived from any of the above.

9. The method of claim 1, wherein identifying terms of unsubmitted input data entered by a user during composition of submitted input data comprises:

recording input data entered by the user during composition of the submitted input data;

in response to submission of the input data by the user, identifying, from the recorded input data, the unsubmitted input data, and deriving a set of unsubmitted terms from the identified unsubmitted input data, wherein the set of unsubmitted terms are potentially relevant to user intent.

10. The method of claim 1, wherein selecting the identified unsubmitted term, for use in supplementing the submitted input data for the performance of the task, comprises:

selecting the unsubmitted term if the determined relevance score exceeds a predefined threshold.

11. A device comprising:

a processor, data storage and a user interface, wherein the user interface is configured for a user to enter input data for the performance of a task, wherein the processor is configured to:

identify terms of unsubmitted input data entered by a user during composition of submitted input data for the performance of a task;

determine, for an identified unsubmitted term, a relevance score indicating the relevance of the unsubmitted term to user intent, wherein the relevance score of the unsubmitted term is determined using a graphical semantic model based on the submitted input data as a representation of user intent, and select, based on the determined relevance score, the identified unsubmitted term, for use in supplementing the submitted input data for the performance of the task.

12. The device of claim 11, wherein the processor is configured to determine the relevance score by:

determining a value of one or more of a set of relevance features for the unsubmitted term, wherein each relevance feature is a parameter associated with a representation of the unsubmitted term in the graphical semantic model, and determining the relevance score based on the determined one or more relevance feature values.

13. The device of claim 12, wherein the processor is configured to determine the relevance score using a method selected from the group consisting of:

calculating the relevance score as a function of the determined one or more relevance feature values, wherein the function defines one or more of thresholds and weights for each relevance feature value, and determining the relevance score using a predictive model of relevance to user intent based on the set of relevance features.

14. The device of claim 11, wherein the processor is further configured to:

obtaining a predefined semantic network graph;

perform spreading activation of the semantic network graph, based on terms of the submitted user data, to generate an activated sub-graph, and utilize the activated sub-graph as the graphical semantic model.

15. The device of claim 14, wherein the processor is configured to determine the relevance score based on one or more values of a set of relevance features comprising parameters associated with at least one node representing the unsubmitted term in the activated sub-graph.

16. The device of claim 15, wherein the relevance features include absence of a node representing the unsubmitted term in the activated sub-graph, wherein the processor is configured to determine the relevance score to be least relevant if a node representing the unsubmitted term is absent from the activated sub-graph.

17. The device of claim 15, wherein the relevance features comprise one or more parameters selected from the group consisting of:

absence of a node representing the term in the activated sub-graph;

distance of a node representing the term from focus node in the activated sub-graph;

raw or activated weight of a node representing the term in the activated sub-graph;

number of in, out or total edges connected to a node representing the term in the activated sub-graph;

variations in the types of edges and nodes that are in proximity to a node representing the term in the activated sub-graph;

number of nodes representing the term in the activated sub-graph, and other features or metrics derived from any of the above.

18. The device of claim 11, wherein the processor is configured to identify terms of unsubmitted input data entered by a user during composition of submitted input data by:

recording input data entered by the user during composition of the submitted input data;

in response to submission of the input data by the user, identifying, from the recorded input data, the unsubmitted input data, and deriving a set of unsubmitted terms from the identified unsubmitted input data, wherein the set of unsubmitted terms are potentially relevant to user intent.

19. The device of claim 11, wherein the processor is configured to select the identified unsubmitted term, for use in supplementing the submitted input data for the performance of the task, by:

selecting the unsubmitted term if the determined relevance score exceeds a predefined threshold.

20. A computer program product comprising a computer readable storage medium having program instructions embodied therewith, wherein the program instructions are executable by a processor to cause the processor to:

identify terms of unsubmitted input data entered by a user during composition of submitted input data for the performance of a task;

determine, for an identified unsubmitted term, a relevance score indicating the relevance of the unsubmitted term to user intent, wherein the relevance score of the unsubmitted term is determined using a graphical semantic model based on the submitted input data as a representation of user intent, and select, based on the determined relevance score, the identified unsubmitted term, for use in supplementing the submitted input data for the performance of the task.

* * * * *